United States Patent
Liu et al.

(10) Patent No.: US 8,005,363 B2
(45) Date of Patent: Aug. 23, 2011

(54) PASSIVE OPTICAL NETWORK WITH WAVELENGTH DIVISION MULTIPLEXING

(75) Inventors: Yanming Liu, Lexington, MA (US); Richard Chen, Fremont, CA (US)

(73) Assignee: Hitachi Communication Technologies, Inc., Santa Clara, CA (US)

( * ) Notice: Subject to any disclaimer, the term of this patent is extended or adjusted under 35 U.S.C. 154(b) by 880 days.

(21) Appl. No.: 11/956,556

(22) Filed: Dec. 14, 2007

(65) Prior Publication Data
US 2009/0154924 A1    Jun. 18, 2009

(51) Int. Cl.
*H04J 14/02* (2006.01)
(52) U.S. Cl. .................. 398/72; 398/68; 398/82
(58) Field of Classification Search ............ 398/68, 398/72, 82
See application file for complete search history.

(56) References Cited

U.S. PATENT DOCUMENTS

| | | | |
|---|---|---|---|
| 7,627,246 B2 * | 12/2009 | Sorin et al. | 398/63 |
| 2003/0180049 A1 * | 9/2003 | Park | 398/72 |
| 2004/0208537 A1 * | 10/2004 | Lee et al. | 398/41 |

\* cited by examiner

*Primary Examiner* — Leslie Pascal
(74) *Attorney, Agent, or Firm* — Haynes & Boone, LLP.

(57) ABSTRACT

In one embodiment, a passive optical network is provided that includes: an optical line terminal (OLT) configured to transmit a plurality of downstream signals into a corresponding plurality of passive optical networks and to receive a corresponding plurality of upstream signals from the plurality of passive optical networks, wherein each downstream signal is separated in wavelength from the remaining wavelength signals, and wherein each upstream signal is separated in wavelength from the remaining upstream signal; a Mux/Demux configured to multiplex the downstream signals from the OLT into a optical fiber and to demultiplex upstream signals from the optical fibers to the OLT; and a splitter configured to split the downstream signals from the OLT to a plurality of optical network units such that each optical network unit receives the plurality of downstream signals.

14 Claims, 3 Drawing Sheets

PASSIVE OPTICAL NETWORK WITH WAVELENGTH DIVISION MULTIPLEXING

TECHNICAL FIELD

The present invention relates generally to passive optical networks, and more particularly to a Passive Optical Network (PON) with wavelength division multiplexing.

BACKGROUND

In a passive optical network such as an Ethernet Passive Optical Network (EPON), a number of optical network units (ONUs) are placed in a corresponding number of offices or homes and are coupled by passive devices to a single optical line terminal (OLT) that may be placed, for example, in a central office of a telephony service provider or cable provider. This last segment in a communication network is often referred to as the "local loop." The OLT may communicate (in both the upstream and downstream directions) with the multiple optical network units by broadcasting Ethernet packets. Each optical network unit (which is also denoted as an optical node terminal (ONT)) extracts packets based on a media-access-control (MAC) address.

EPON offers a number of advantages over other local loop high bandwidth solutions. For example, a copper-based T1 line requires numerous repeaters to continually boost the signal whereas an EPON uses passive components between the OLT and the ONUs. DSL and cable modems tend to more complex and require considerably more maintenance and have greatly reduced bandwidth as compared to optical fiber. As compared to other optical protocols such as asynchronous transfer mode (ATM), EPON uses the simpler and much more robust IEEE 802 standard, which allows for variable-sized packets. In contrast to the fixed packet size used in ATM, the variable-sized packets in Ethernet applications are much more compatible with Internet Protocol (IP) communications. Because EPON's point-to-multipoint topology is economical yet takes advantage of optical fiber bandwidth, EPON is increasingly being implemented as the local loop solution for both fiber-to-the-business (FTTB) and fiber-to-the-home (FTTH) systems.

An EPON provides a one giga-bit-per-second (Gbps) data transmission rate in both the downstream (OLT to ONU) and upstream (ONU to OLT) directions. Through time-division-multiplexing, a variety of ONUs may share the 1 Gbps bandwidth. To provide additional bandwidth, other passive optical standards such as a Gigabit-capable-passive-optical network (GPON) standard have been developed. Regardless of the particular passive optical network standard being used, there is only so much upstream and downstream traffic that may be accommodated. These bandwidth limitations may be problematic in established fiber optic networks. For example, a fiber optic network may have been implemented many years ago. At that time, a provision of six (for example) available optical fibers to each network node may have been considered more than adequate for any conceivable data traffic. However, due to the explosive development of the Internet (and its related data and video communication demands), such an established optical network may not be adequate for current or future bandwidth demands. However, construction costs to add additional optical fiber are prohibitive.

Rather than add additional cable, wavelength division multiplexing (WDM) passive optical networks (PONs) have been developed in which multiple PONs share a single optical fiber. Each PON has a single ONU that uses a particular wavelength to communicate with the OLT. The OLT thus includes a plurality of optical transceivers, where each transceiver it tuned to a corresponding wavelength pair (one wavelength for downstream traffic, the remaining wavelength being reserved for upstream traffic). In the downstream direction, a first multiplexer/demultiplexer (Mux/Demux) multiplexes the downstream data traffic from the OLT onto the optical fiber. A second Mux/Demux demultiplexes these downstream frequencies to the corresponding optical network units (ONUs). In the upstream direction, the second Mux/Demux multiplexes the upstream frequencies from the various ONUs onto the optical fiber whereupon they are then demultiplexed by the first Mux/Demux for distribution to the corresponding transceivers in the OLT. It may thus be seen that conventional wavelength division multiplexed PONS are point-to-point systems: Each ONU has its own frequency band for upstream and downstream traffic with the OLT such that each OLT/ONU pair forms its own individual PON.

Although conventional WDM-PON systems thus multiplex several PONs onto a single optical fiber, the point-to-point nature of these systems limits communication flexibility. Accordingly, there is a need in the art for improved PON systems that increase the number of ONUs that may be serviced with regard to a given optical fiber.

SUMMARY

In accordance with an aspect of the invention, a passive optical network is provided that comprises: an optical line terminal (OLT) configured to transmit a plurality of downstream signals into a corresponding plurality of passive optical networks and to receive a corresponding plurality of upstream signals from the plurality of passive optical networks; a Mux/Demux configured to multiplex the downstream signals from the OLT into an optical fiber and to demultiplex upstream signals from the optical fiber to the OLT; and a splitter configured to split the downstream signals from the OLT to a plurality of optical network units such that each optical network unit receives the plurality of downstream signals.

In accordance with another aspect of the invention, a network is provided that includes: an optical line terminal (OLT) configured to transmit a plurality of downstream signals into a corresponding plurality of passive optical networks and to receive a corresponding plurality of upstream signals from the plurality of passive optical networks, wherein each passive optical network has a unique downstream signal separated in wavelength from the remaining downstream signals and has a downstream wavelength longer than an absorption region, and wherein each passive optical network has a unique upstream signal separated in wavelength from the remaining upstream signals and has an upstream wavelength shorter than the absorption region; a first multiplexer/demultiplexer (Mux/Demux) configured to multiplex the downstream signals from the OLT into an optical fiber and to demultiplex upstream signals from the optical fiber to the OLT, wherein the absorption region corresponds to a water absorption region for the optical fiber; and a second Mux/Demux configured to split the downstream signals from the optical fiber to a plurality of optical network units organized into classes corresponding to the plurality of passive optical networks such that each optical network unit (ONU) class receives only its corresponding passive optical network's downstream signal, each ONU class being configured to transmit the upstream signal corresponding to its passive optical network, the second Mux/Demux being further configured to multiplex the upstream signals from the ONU classes onto the optical fiber.

The invention will be more fully understood upon consideration of the following detailed description, taken together with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
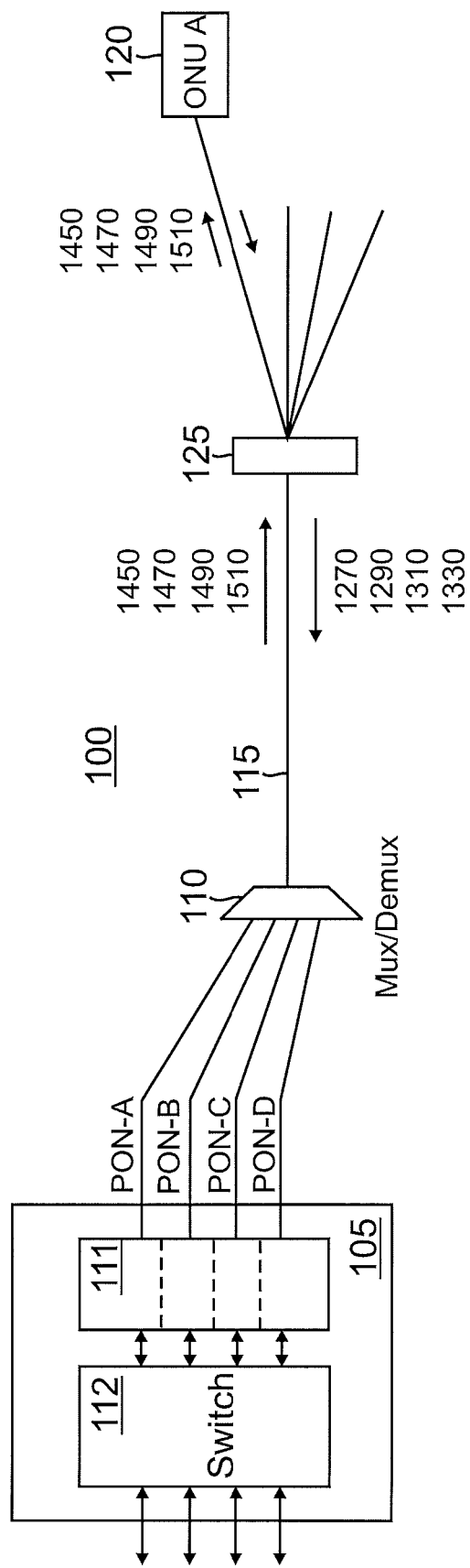
FIG. 1 illustrates an example WDM-PON system with a single Mux/Demux.

As discussed herein, the use of wavelength division multiplexing such as coarse wavelength division multiplexing (CWDM) allows multiple passive optical networks to share the same optical fiber. The following discussion will address the multiplexing of a plurality of Ethernet passive optical network (EPON) onto a single optical fiber using CWDM, but it will be appreciated that the techniques and apparatus discussed herein may be applied to other passive optical network such as GPON. Moreover, although the wavelength divisions in the upstream and downstream traffic correspond to CWDM divisions, it will be appreciated that other wavelength divisions may be used such as employed in dense wavelength division multiplexing (DWDM). Turning now to FIG. 1, an example Ethernet passive optical network (EPON) 100 is illustrated. An optical line terminal (OLT) 105 supports a plurality of passive optical networks—for example, OLT 105 supports four PONs designated as PON A, PON B, PON C, and PON D. It will be appreciated that the number of supported PONs may be greater or smaller than four. However, as will be discussed later, each PON requires a dedicated type of optical network unit (ONU) having its own laser source tuned to the wavelength corresponding to the ONU type. As the number of PONs supported by OLT 105 is increased, a user would have to service an ever greater number of ONUs, thereby increasing complexity and complicating network maintenance. Thus, the following discussion will assume without loss of generality that OLT 105 supports just four PONs A through D.

In one embodiment, the upstream signals (those being transmitted to OLT 105) corresponding to each PON may be separated in wavelength according to a coarse wavelength division multiplexing separation of twenty nanometers (nm). Similarly, the downstream signals (those being transmitted from OLT 105) corresponding to each PON may also be separated in wavelength by twenty nm. To achieve maximum separation between the upstream and downstream channels as well as to avoid the water absorption region in one embodiment, the downstream wavelengths may be longer than the water absorption region whereas the upstream wavelengths may be shorter than the water absorption region. As known in the optical fiber arts, the water absorption region is a wavelength range of approximately 80 nm centered around 1383 nm resulting from the absorption induced by hydrogen-oxygen bonds in the fiber substrate.

In addition to avoiding the water absorption region, the wavelengths selected for the various PONs being supported may be selected so as to avoid 1550 nm because this wavelength is used for video in cable television optical fiber local loops. An example set of downstream wavelengths may thus be 1450 nm, 1470 nm, 1490 nm, and 1510 nm. Similarly, an example set of upstream wavelengths may be 1270 nm, 1290 nm, 1310 nm, and 1330 nm. Given these possible CWDM wavelength assignments, each PON may be assigned a pair of wavelengths have the widest frequency separation possible such that the available downstream/upstream wavelength pairs for each PON comprises 1450 nm/1270 nm, 1470 nm/1290 nm, 1490 nm/1310 nm, and 1510 nm/1330 nm. OLT 105 may include an optical line card/transceiver 111 corresponding to each wavelength pair. The baseband data signals are extracted in each transceiver as known in the art and supplied to an Ethernet switch 112. Alternatively, these signals may be processed by a router or other network components.

OLT 105 receives four optical fibers PON-A through PON-D corresponding to the four wavelength pairings. The 1490/1310 nm wavelength pairing corresponds to the default wavelength pairing implemented in conventional EPON. It may be seen that the alternative wavelength pairings also achieve the 180 nm separation between upstream and downstream wavelengths as used in a conventional EPON system.

Figure 2:
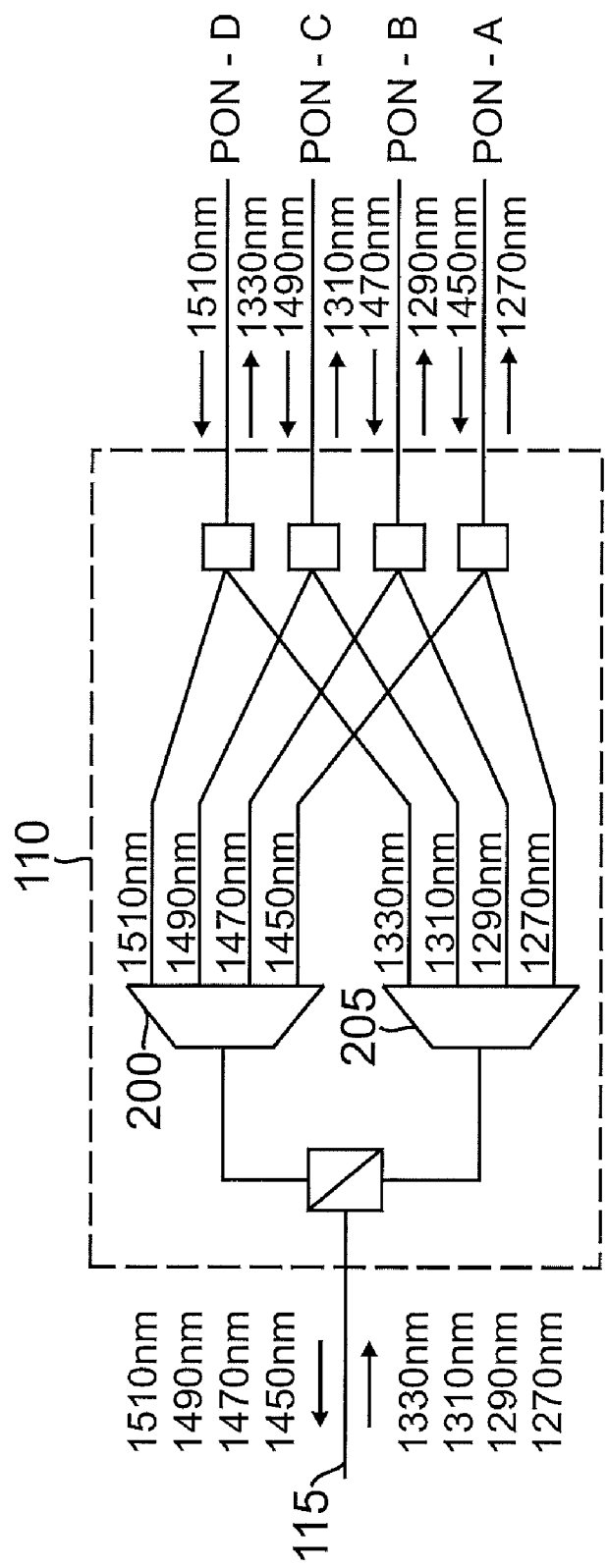
FIG. 2 is a functional block diagram of the Mux/Demux in FIG. 1.

A Mux/Demux 110 receives the four optical fibers from OLT 105 and multiplexes the downstream signals onto an optical fiber 115. Similarly, Mux/Demux 110 demultiplexes the upstream signals onto the four optical fibers leading to the OLT 105 according to their wavelengths. Turning now to FIG. 2, a functional block diagram of Mux/Demux 110 is illustrated. PONs A through D are received from OLT 105 and the downstream signals multiplexed onto fiber 115 through a multiplexer 200. Similarly, the four upstream signals from optical fiber 115 are demultiplexed across PONs A through D according to their wavelengths through a demultiplexer 205.

Referring back to FIG. 1, each PON requires a unique ONU type because each PON type has a unique wavelength pairing. For illustration clarity, only an ONU type A 120 corresponding to PON-A is illustrated. A passive splitter 125 splits the downstream signals to each ONU. Thus, each type of ONU will receive all the downstream wavelengths. To eliminate the wavelengths corresponding to other PON types, each ONU may include a pass filter (not illustrated) having a center frequency corresponding to its assigned downstream wavelength. Thus, ONU A would have a pass filter centered at 1450 nm and its transmitter tuned to 1270 nm. Because CWDM is an established technology, the corresponding laser sources for the required ONU types will be readily available if the wavelength divisions correspond to the 20 nm separation used in CWDM. Similar to each ONU A, an ONU B (not illustrated) would have a pass filter centered at 1470 nm and its transmitter tuned to 1290 nm, and so on. Each pass filter would be located before a photodetector (not illustrated) within the corresponding ONU. In this fashion, EPON 100 need include only a single Mux/Demux 110. In one embodiment, each ONU may be manufactured in a generic fashion with regard to the various ONU types and then dedicated to a particular class through an appropriate small form-factor pluggable (SFP) module (not illustrated). Because one of the wavelength pairs corresponds to the default EPON wavelength assignments, it may be seen that the components within the corresponding SFP module for this assignment will take advantage of already-available manufactures. OLT 105 may also be manufactured in a generic fashion and then configured for the particular PONS it will support through SFP modules.

Because splitter 125 passively splits the downstream signals to the various ONUs, there is a limit to the number of ONUs that may be coupled to any one OLT 105. For example, an upper range for the total number of ONUs in any given EPON 100 may be sixty-four. In an EPON embodiment, each PON type provides a symmetric bandwidth of one Giga bps in both the upstream and downstream directions. Thus, if each user demanded the greatest achievable upstream and downstream bandwidth of one Giga bps, there could only be four ONUs per each OLT—namely, one ONU A, one ONU B, one ONU C, and one ONU D. However, because the upstream bandwidth in EPON systems may be time division multiplexed among multiple ONUs, the 4 Giga bps total upstream bandwidth may be partitioned in many different ways. For example, there may be three ONUs (each of different types) having a one Giga bps upstream bandwidth and a 29 ONUs of a remaining type each having a 30 Mega bps upstream bandwidth. The following Table 1 summarizes a variety of bandwidth selections

TABLE 1

| 1 | 4 × 1 Gbps |
| --- | --- |
| 2 | 3 × 1 Gbps |
|   | 29 × 30 Mbps |
| 3 | 2 × 1 Gbps |
|   | 8 × 30 Mbps |
|   | 22 × 50 Mbps |
| 4 | 2 × 1 Gbps |
|   | 16 × 120 Mbps |
| 5 | 1 × 1 Gbps |
|   | 24 × 120 Mbps |
| 6 | 1 × 1 Gbps |
|   | 4 × 250 Mbps |
|   | 16 × 120 Mbps |
| 7 | 1 × 1 Gbps |
|   | 8 × 250 Mbps |
|   | 23 × 40 Mbps |

It will be appreciated that Table 1 illustrates example bandwidth assignments such that the total bandwidth (symmetric in both directions) may be assigned in other fashions.

Figure 3:
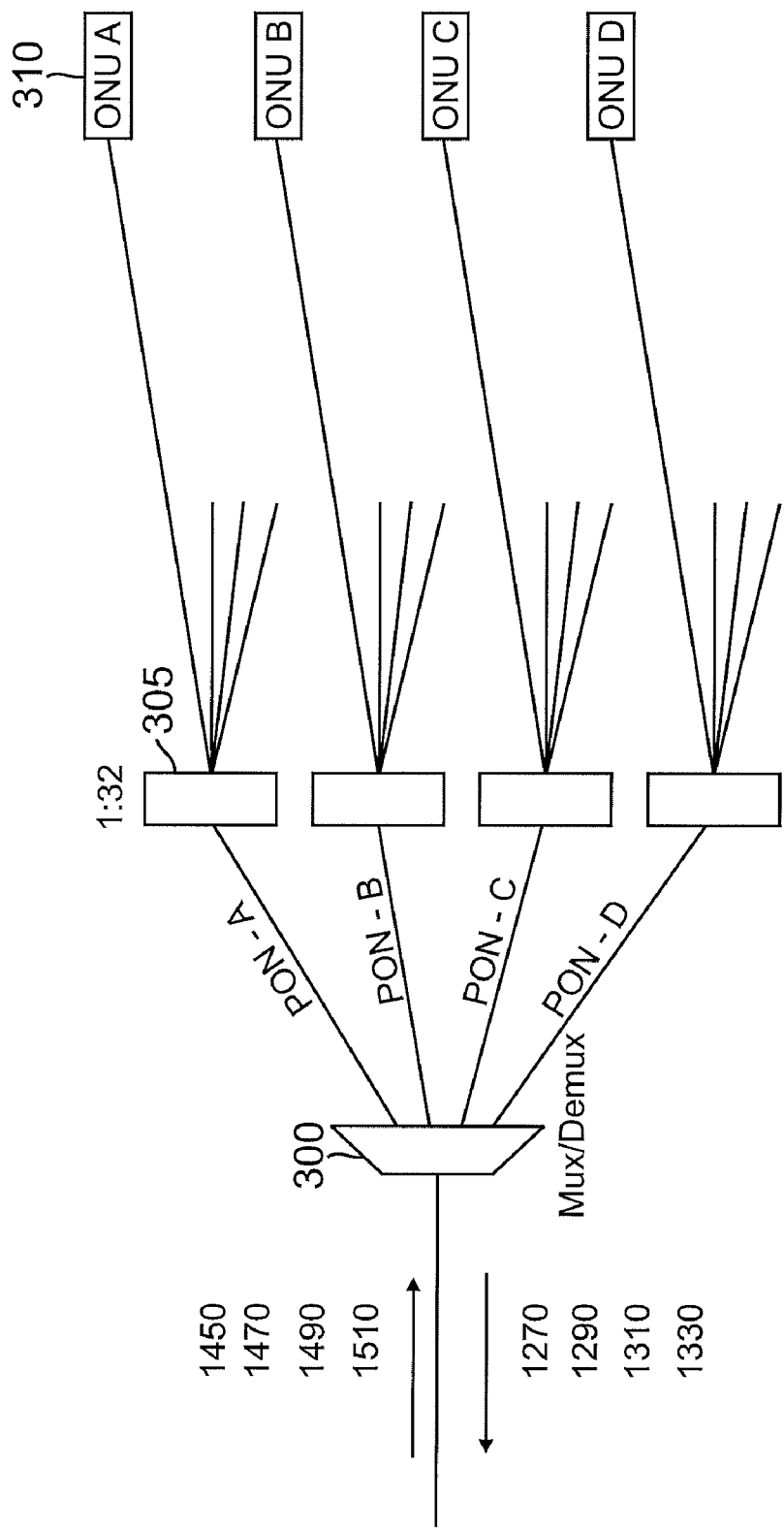
FIG. 3 illustrates a modification of the system of FIG. 1 such that it includes a second Mux/Demux.

The splitter 125 discussed with regard to FIG. 1 may be replaced with a second Mux/Demux 300 as shown in FIG. 3. Mux/Demux 300 demultiplexes the downstream signals from OLT 105 (FIG. 1) onto optical fibers PON A through PON D. Each of these PONs may then be split through splitters such as 1:32 splitters 305. Because of the demultiplexing, there is one splitter 305 per PON type. The corresponding ONUs such as an ONU A 310 need not include a bandpass filter since Mux/Demux 300 has demultiplexed the downstream signals. Regardless of whether a second Mux/Demux is implemented, the resulting passive optical network allows a user to multiplex a given optical fiber to many more ONUs than would otherwise be achievable in a conventional passive optical network system. Moreover, this multiplexing is achieved in a point-to-multipoint (each wavelength assignment supporting multiple ONUs) fashion as compared to the point-to-point nature of conventional WDM-PONs. Moreover, the wavelength selections discussed herein provide a maximum wavelength separation between the upstream and downstream channels while avoiding the water absorption region. In addition, these wavelength selections may avoid interference with video signals in a cable television local loop.

It will be obvious to those skilled in the art that various changes and modifications may be made without departing from this invention in its broader aspects. For example, the various wavelengths in the upstream and downstream directions may be separated by a wavelength separation longer or shorter than 20 nm. Moreover, the divisions between wavelength assignments need not be evenly spaced. The appended claims encompass all such changes and modifications as fall within the true spirit and scope of this invention.

We claim:

1. A network, comprising:
an optical line terminal (OLT) configured to transmit a plurality of downstream signals into a corresponding plurality of Ethernet passive optical networks and to receive a corresponding plurality of upstream signals from the plurality of Ethernet passive optical networks (EPONs), wherein each Ethernet passive optical network (EPON) has a unique downstream signal separated in wavelength from the remaining downstream signals, and wherein each passive optical network has a unique upstream signal separated in wavelength from the remaining upstream signals, each EPON being configurable to time division multiplex its unique upstream signal among a plurality of users;
a multiplexer/demultiplexer (Mux/Demux) configured to multiplex the downstream signals from the OLT into an optical fiber and to demultiplex upstream signals from the optical fiber to the OLT; and
a splitter configured to split the downstream signals from the OLT to a plurality of optical network units such that each optical network unit (ONU) receives the plurality of downstream signals, wherein the plurality of optical network units are organized into ONU classes corresponding to the plurality of EPONS, each class of ONU including a bandpass filter having a center frequency matching the corresponding EPON's downstream signal's wavelength and having a transmitter matching the corresponding EPON's upstream signal's wavelength.

2. The network of claim 1, wherein the plurality of EPONs comprises at least four EPONs and each downstream signal has a wavelength longer than an absorption region, and wherein each upstream signal has a wavelength shorter than the absorption region, and wherein the absorption region corresponds to a water absorption region for the optical fiber.

3. The network of claim 2, wherein the plurality of EPONs is four passive optical networks.

4. The network of claim 3, wherein the upstream wavelengths are separated according to a coarse wavelength division multiplexing (CWDM) separation of 20 nm, and wherein the downstream wavelengths are separated according to the CWDM separation of 20 nm.

5. The network of claim 4, wherein the downstream wavelengths are substantially 1450 nm, 1470 nm, 1490 nm, and 1510 nm.

6. The network of claim 4, wherein the upstream wavelengths are substantially 1270 nm, 1290 nm, 1310 nm, and 1330 nm.

7. The network of claim 4, wherein a first one of the EPONs has an upstream wavelength of 1270 nm and a downstream wavelength of 1450 nm, a second one of the EPONs has an upstream wavelength of 1290 nm and a downstream wavelength of 1470 nm, a third one of the EPONs has an upstream wavelength of 1310 nm and a downstream wavelength of 1490 nm, and a fourth one of the EPONs has an upstream wavelength of 1330 nm and a downstream wavelength of 1510 nm.

8. A network, comprising:

an optical line terminal (OLT) configured to transmit a plurality of downstream signals into a corresponding plurality of Ethernet passive optical networks (EPONs) and to receive a corresponding plurality of upstream signals from the plurality of EPONs, wherein each Ethernet passive optical network (EPON) has a unique downstream signal separated in wavelength from the remaining downstream signals and has a downstream wavelength longer than a water absorption wavelength region, and wherein each passive optical network has a unique upstream signal separated in wavelength from the remaining upstream signals and has an upstream wavelength shorter than the water absorption wavelength region, each EPON being configurable to time division multiplex its unique upstream signal among a plurality of users;

a first multiplexer/demultiplexer (Mux/Demux) configured to multiplex the downstream signals from the OLT into an optical fiber and to demultiplex upstream signals from the optical fiber to the OLT, wherein the absorption region corresponds to a water absorption region for the optical fiber; and a second Mux/Demux configured to split the downstream signals from the optical fiber to a plurality of optical network units organized into classes corresponding to the plurality of passive optical networks such that each optical network unit (ONU) class receives only its corresponding passive optical network's downstream signal, each ONU class being configured to transmit the upstream signal corresponding to its passive optical network, the second Mux/Demux being further configured to multiplex the upstream signals from the ONU classes onto the optical fiber, each class of ONU including a bandpass filter having a center frequency matching the corresponding EPON's downstream signal's wavelength and having a transmitter matching the corresponding EPON's upstream signal's wavelength.

9. The network of claim 8, wherein the plurality of passive optical networks comprises at least four passive optical networks.

10. The network of claim 9, wherein the plurality of passive optical networks is four passive optical networks.

11. The network of claim 10, wherein the upstream wavelengths are separated according to a coarse wavelength division multiplexing (CWDM) separation of 20 nm, and wherein the downstream wavelengths are separated according to the CWDM separation of 20 nm.

12. The network of claim 11, wherein the downstream wavelengths are 1450 nm, 1470 nm, 1490 nm, and 1510 nm.

13. The network of claim 12, wherein the upstream wavelengths are 1270 nm, 1290 nm, 1310 nm, and 1330 nm.

14. The network of claim 11, wherein a first one of the passive optical networks has an upstream wavelength of 1270 nm and a downstream wavelength of 1450 nm, a second one of the passive optical networks has an upstream wavelength of 1290 nm and a downstream wavelength of 1470 nm, a third one of the passive optical networks has an upstream wavelength of 1310 nm and a downstream wavelength of 1490 nm, and a fourth one of the passive optical networks has an upstream wavelength of 1330 nm and a downstream wavelength of 1510 nm.

* * * * *